Patented June 19, 1934

1,963,119

UNITED STATES PATENT OFFICE 1,963,119

MANUFACTURE OF OXYGENATED ORGANIC COMPOUNDS

Henry Dreyfus, London, England

No Drawing. Application July 21, 1930, Serial No. 469,649. In Great Britain July 24, 1929

11 Claims. (Cl. 260—156)

This invention relates to the manufacture of oxygenated organic compounds from oxides of carbon and hydrogen, or alternatively from compounds synthesized therefrom, e. g. methyl alcohol, mixed or not with oxides of carbon and/or hydrogen.

Iron, cobalt and nickel are well known as hydrogenating catalysts, but in the hydrogenation of oxides of carbon it has been considered that the presence of these metals or compounds containing them has been productive of hydrocarbons such as methane and deleterious to the production of oxygenated organic compounds. Mixed with small amounts of alkali, they lead to the production of mixtures containing too many individual products to be of any value commercially.

After a long series of researches upon the synthesis of organic compounds from oxides of carbon and hydrogen in the presence of catalysts consisting of or containing iron, cobalt and nickel or their compounds, I have found that these metals, far from being deleterious to the production of oxygenated organic compounds, direct the reaction, if present in suitable form, towards the production of particular oxygenated organic compounds. More especially I have found that if these metals be present in the form of compounds with the oxy acids of the elements of the group phosphorus, boron, silicon, or if they be present in intimate association with other salts of these oxy acids, they tend to influence the reaction towards the production of compounds of a higher order than methyl alcohol, and particularly of compounds which contain two or three carbon atoms, for example acetaldehyde, ethyl alcohol, propyl alcohol and acetone. This discovery is the more remarkable when it is considered that compounds containing two and perhaps three, carbon atoms have been noticeably absent from, or only present in relatively small proportions in, reaction mixtures synthesized from oxides of carbon and hydrogen.

According to the present invention therefore oxygenated organic compounds are produced by the catalytic hydrogenation of carbon monoxide or carbon dioxide or mixtures thereof in presence of iron, cobalt and nickel in the form of compounds of the oxy acids of the group phosphorus, boron, silicon, or in the form of the free metals or compounds thereof in intimate association with other compounds of these oxy acids. All such compounds are hereinafter included in the term "catalysts comprising a metal of the iron group in conjunction with an oxy acid of the group phosphorus, boron, silicon".

In particular the present invention contemplates the use of iron, cobalt and nickel in the form of borates, silicates and phosphates or other salts of oxy acids of phosphorus.

The iron, cobalt or nickel in the form of the above compounds may be present in the reaction vessel or chamber alone, in admixture with each other or in admixture or chemical combination, e. g. as double salts, with other metals in the free or combined state, for example zinc, magnesium, calcium, aluminium, chromium, molybdenum, vanadium, manganese, tungsten or uranium, or with two or more of these metals in the free or combined state, for example with zinc and vanadium; with zinc and molybdenum; with zinc and magnesium, calcium or aluminium; with chromium and vanadium, with chromium and manganese; with chromium and molybdenum; or with chromium, manganese or molybdenum, and magnesium, calcium or aluminium. The other metals may, for instance, be present as oxides or as salts with the oxy acids of the 2nd, 3rd, 4th and 5th groups of the Periodic System. Double salts of the iron, cobalt or nickel and the other metal or metals with the said oxy acids may for instance be used.

Any or all of the above catalytic mixtures, or the iron, nickel and cobalt catalysts alone or in admixture with each other may be employed according to the present invention in conjunction with copper, the presence of the copper, even in small proportions, exercising a favourable influence upon the reaction. Alternatively or in addition, as hereinafter referred to, the reaction may be carried out in copper vessels or in copper lined vessels. The catalysts or catalyst mixtures of the present invention may furthermore be used in admixture or in association with alkali or alkaline earth ferrites, ferrates, cobaltates, cobaltites or other salts containing the iron or cobalt in the acid radicle.

It is advantageous for the production of the oxygenated compounds, of a higher order than methyl alcohol, particularly contemplated by the present invention, to use the iron, cobalt or nickel in association or chemical combination with metals of the alkali or alkaline earth series, for example sodium, potassium, calcium, barium and magnesium. These alkali and alkaline earth metals may be present in any desired proportion in relation to the iron, cobalt or nickel. For example they may be present in a proportion of 1 equivalent of the alkali or alkaline earth metal to 2 equivalents of iron, cobalt and nickel, but improved results are obtainable by using them in a relatively higher proportion such as 1, 1½ or 2 or more equivalents of alkali or alkaline earth metal to 1 equivalent of iron, cobalt and nickel. Here again double salts of the alkali or alkaline earth metals and the iron, cobalt or nickel may be employed.

As an alternative to employing the iron, cobalt or nickel in the form of simple borates, silicates, or phosphates, the iron, cobalt or nickel, with or without other metals, may be present in the form of complex salts containing these oxy acids, for example in the form of boro-silicates, boro-tungstates, titano-silicates, phospho-molybdates, phospho-tungstates, phospho-vanadates, silico-molybdates, silico-tungstates, phospho-tungsto-silicates, phospho-molybdo-silicates and phospho-tungsto-molybdates etc.

Initially the iron, cobalt or nickel may be present in the form of a salt of any of the oxy acids phosphorus, boron, silicon. For example the metal may be present in the form of ortho, pyro or meta phosphates or in the form of phosphites or hypo-phosphites or in the form of ortho or meta silicates.

Such compounds may contain the metal and the acid radicle in any convenient proportion, but it is found that by using a salt containing the acid radicle in an excess over that chemically equivalent to the metal, particularly advantageous results are obtainable. Where such compounds are acid salts such as acid phosphates, acid silicates, and the like they may be produced in any convenient manner. For instance they may be produced by a partial neutralization of the acid or they may be produced either previous to or during the reaction by simple heating of a complex metallo ammonium salt of the acid, for example a complex metallo ammonium phosphate. In place of an acid salt, a normal salt in admixture with the acid may be used, or for instance there may be employed other compounds of the metals with the acids referred to and having an excess of acid radicle over the metal radicle, as for instance ferric silicate, e. g. the mineral anthosiderite 2Fe₂O₃ 9SiO₂, nickel octaborate, cobalt octaborate.

Reacting gases of varying composition may be employed for the purpose of the present invention, for example reacting gases containing two volumes of carbon monoxide or dioxide to one volume of hydrogen, or equal volumes of carbon monoxide or dioxide and of hydrogen, or one volume of carbon monoxide or dioxide to two volumes of hydrogen. Mixtures containing intermediate proportions of carbon monoxide or dioxide and hydrogen may be employed, or mixtures containing the reacting gases in proportions outside the limits indicated above. Mixtures of carbon monoxide and dioxide may of course be employed.

The reaction according to the present invention may be conducted at any suitable temperature for the synthesis of organic compounds, for example temperatures ranging from 200° to 250° C. to 400° to 500° or even 600° C. or more, but preferably temperatures are used between 250° and 400° C., and particularly between temperatures of 250° to 300° to 350° C. The reaction is preferably carried out under pressure, for example pressures of 50, 100, 200, 300 or 500 atmospheres or more.

I have further found that the catalysts or catalyst mixtures of the present invention may be employed for the production of further oxygenated organic compounds from compounds, e. g. methyl or ethyl alcohol or other alcohols, obtainable from oxides of carbon and hydrogen. The methyl alcohol or other compounds indicated may be used alone or in conjunction with carbon monoxide, carbon dioxide and/or hydrogen. In this modification of the invention methyl alcohol, for example, may be converted into compounds of a higher order, for example into ethyl alcohol, acetaldehyde, acetic acid etc. The vapours of the methyl alcohol or other compound may be passed with or without carbon monoxide or dioxide and with or without hydrogen over the iron, nickel or cobalt containing catalysts referred to above contained in a heated reaction vessel. The carbon monoxide or dioxide and/or hydrogen, if used, may be mixed with methyl alcohol vapour in any desired manner, for example such a mixture may be prepared by bubbling the gases through a heated vessel containing methyl alcohol, or alternatively the methyl alcohol may be sprayed into a current of the gas. The methyl alcohol or other compound may be prepared in a preliminary operation continuously with its use according to the present invention for the production of higher oxygenated organic compounds. Mixtures of carbon monoxide or carbon dioxide and hydrogen or gases containing such mixtures may be passed through a reaction chamber containing zinc oxide or basic zinc chromate or other catalysts or catalyst mixtures capable of producing methyl alcohol, and the resulting gas or vapours passed directly over the catalysts or catalyst mixtures of the present invention. Instead of using methyl alcohol or other compound obtainable from carbon monoxide or dioxide and hydrogen, compounds capable of yielding the methyl alcohol etc. may be used, for example methyl formate, methyl acetate or dimethyl ether.

In the present invention it is not of course necessary to utilize pure reacting gases. Mixtures containing the desired reacting gases may be employed, for example coke oven gas, producer gas, water gas and the like. The proportions of reacting gases in such industrial gases may be adjusted if desired by suitable additions. The reacting gases may contain inert gases, such as nitrogen, or they may contain hydrocarbons, for example methane. The presence of methane or other paraffins or other hydrocarbons forms an important feature of the present invention. The methane or the like may, if desired, wholly or partly replace the hydrogen or may be used in addition thereto.

The reactions according to the present invention may be carried out in any suitable reaction chambers. As referred to above the use of copper chambers or copper lined chambers present advantages, but steel chambers, and particularly steel containing molybdenum, tungsten, manganese, cobalt, nickel or the like, may also be used.

The following examples serve to illustrate convenient forms of execution of the invention, it being understood that they are given only by way of illustration and are in no way limitative.

*Example 1*

Water gas containing about 30% carbon monoxide and 65% hydrogen is passed under a pressure between about 100 and 200 atmospheres in contact with a catalyst composed of one or more of the following compounds heated to a temperature between 250° and 400° C., viz:—

Cobalt octaborate
Nickel octaborate
Cobalt magnesium borate $(2B_2O_3(CoOMgO)_3)$
Ferric meta phosphate
Ferric silicate (e. g. anthosiderite $2Fe_2O_3 9SiO_2$)
There results a copious yield of ethanol and higher alcohols together with aldehydes and acids.

Example 2

Methanol or a mixture of methanol and carbon monoxide, carbon dioxide or hydrogen is passed under a pressure of between about 100 and 200 atmospheres in contact with a catalyst composed of one or more of the metal compounds referred to in Example 1 heated to a temperature between 250° and 400° C. There likewise results a copious yield of ethanol and higher alcohols. In the case where methanol is employed alone or in conjunction with carbon monoxide or dioxide (and particularly carbon dioxide) acetaldehyde, acetic acid and higher acids, aldehydes and esters appear in the product. When, however, hydrogen is employed in conjunction with the methanol the aldehydes, acids and esters are substantially absent from the product.

What I claim and desire to secure by Letters Patent is:—

1. Process for the synthesis of oxygenated organic compounds from a mixture consisting of at least two substances selected from the group consisting of hydrogen, an oxide of carbon and an oxygenated organic interaction-product thereof, which comprises acting upon said reagents with a heated catalyst comprising essentially a metal of the iron group in combined form and a salt of an oxy acid of an element selected from the group consisting of phosphorus, boron and silicon.

2. Process for the synthesis of oxygenated organic compounds from a mixture consisting of at least two substances selected from the group consisting of hydrogen, an oxide of carbon and an oxygenated organic interaction-product thereof, which comprises acting upon said reagents with a heated catalyst comprising essentially a metal of the iron group chemically combined with an oxy acid of an element selected from the group consisting of phosphorus, boron and silicon.

3. Process for the synthesis of oxygenated organic compounds from a mixture consisting of at least two substances selected from the group consisting of hydrogen, an oxide of carbon and an oxygenated organic interaction-product thereof, which comprises acting upon said reagents with a heated catalyst comprising essentially an iron salt of an oxy acid of phosphorus.

4. Process for the synthesis of oxygenated organic compounds from a mixture consisting of at least two substances selected from the group consisting of hydrogen, an oxide of carbon and an oxygenated organic interaction-product thereof, which comprises acting upon said reagents with a heated catalyst comprising essentially ferric metaphosphate.

5. Process for the synthesis of oxygenated organic compounds, which comprises subjecting a mixture of carbon monoxide and hydrogen to a temperature between 250° and 400° C. and a pressure of at least 50 atmospheres, in presence of a catalyst mass comprising essentially a metal of the iron group in combined form and a compound of an oxy acid of an element selected from the group consisting of phosphorus, boron and silicon.

6. Process for the synthesis of oxygenated organic compounds, which comprises subjecting a mixture of carbon monoxide and hydrogen to a temperature between 250° and 400° C. and a pressure of at least 50 atmospheres, in presence of a catalyst mass comprising essentially a metal of the iron group chemically combined with an oxy acid of an element selected from the group consisting of phosphorus, boron and silicon.

7. Process for the synthesis of oxygenated organic compounds, which comprises subjecting a mixture of carbon monoxide and hydrogen to a temperature between 250° and 400° C. and a pressure of at least 50 atmospheres, in presence of a catalyst mass comprising essentially an iron salt of an oxy acid of phosphorus.

8. Process for the synthesis of oxygenated organic compounds, which comprises subjecting a mixture of carbon monoxide and hydrogen to a temperature between 250° and 400° C. and a pressure of at least 50 atmospheres, in presence of a catalyst mass comprising essentially ferric metaphosphate.

9. Process for the synthesis of oxygenated organic compounds, which comprises subjecting methanol in admixture with carbon monoxide to the action of a temperature between 250° and 400° C. and a pressure between 100 and 200 atmospheres, in presence of a catalyst mass comprising essentially a metal of the iron group in the form of a salt of an oxy acid of the group phosphorus, boron, silicon.

10. Process for the synthesis of oxygenated organic compounds, which comprises subjecting methanol in admixture with carbon monoxide to the action of a temperature between 250° and 400° C. and a pressure between 100 and 200 atmospheres, in presence of a catalyst mass comprising essentially an iron salt of an oxy acid of phosphorus.

11. Process for the synthesis of oxygenated organic compounds, which comprises subjecting methanol in admixture with carbon monoxide to the action of a temperature between 250° and 400° C. and a pressure between 100 and 200 atmospheres, in presence of a catalyst mass comprising essentially ferric metaphosphate.

HENRY DREYFUS.